United States Patent
Tsai

(10) Patent No.: US 8,376,384 B2
(45) Date of Patent: Feb. 19, 2013

(54) SAFEGUARD WHEEL ASSEMBLY FOR A TWO-WHEELED VEHICLE

(76) Inventor: Hui-Te Tsai, Taipei (TW)

( * ) Notice: Subject to any disclaimer, the term of this patent is extended or adjusted under 35 U.S.C. 154(b) by 481 days.

(21) Appl. No.: 12/762,363

(22) Filed: Apr. 18, 2010

(65) Prior Publication Data

US 2011/0042918 A1    Feb. 24, 2011

(30) Foreign Application Priority Data

Aug. 18, 2009    (TW) .............................. 98127659 A

(51) Int. Cl.
    *B62H 1/12*    (2006.01)
(52) U.S. Cl. ........................................ 280/293; 280/301
(58) Field of Classification Search .................. 280/293, 280/298, 299, 300, 301, 302, 303, 304, 124.103, 280/755
    See application file for complete search history.

(56) References Cited

U.S. PATENT DOCUMENTS

| | | | | |
|---|---|---|---|---|
| 720,860 | A * | 2/1903 | Trützschler | 280/293 |
| 2,116,027 | A * | 5/1938 | Kolbe | 280/124.103 |
| 4,203,500 | A * | 5/1980 | Kamiya | 180/219 |
| 5,064,213 | A * | 11/1991 | Storch | 280/301 |
| 6,296,266 | B1 * | 10/2001 | Martin | 280/293 |
| 6,976,693 | B2 * | 12/2005 | Alder | 280/302 |
| 7,641,213 | B1 * | 1/2010 | Chen | 280/293 |
| 7,712,759 | B2 * | 5/2010 | Bell | 280/293 |

* cited by examiner

*Primary Examiner* — Paul N Dickson
*Assistant Examiner* — Wesley Potter

(57) ABSTRACT

A wheel safeguard assembly installed on a bottom of a main body of a two-wheeled vehicle includes: two guide columns attached on respective sides of a rear end of the main body; a base disposed across the rear end of the main body and behind a rear wheel of the vehicle; two rollers pivoted on respective sides of the base; two rotatable linkages, one end of each linkage pivoted to the respective side of the rear end, and another end of each linkage pivoted to the respective side of the base adjacent to the rollers; two guide slots formed in the respective sides of the base and the guide columns disposed in respective guide slots.

14 Claims, 11 Drawing Sheets

SAFEGUARD WHEEL ASSEMBLY FOR A TWO-WHEELED VEHICLE

BACKGROUND OF THE INVENTION

1. Field of the Invention

The present invention relates to a safeguard wheel assembly for a two-wheeled vehicle, and more particularly to a safeguard wheel assembly for a two-wheeled vehicle which can improve the stability, safety and convenience of a two-wheeled vehicle.

2. Description of the Related Art

Currently, with busy modern life styles make time more precious for people, parking space being difficult to find, and high fuel prices, more and more people are choosing two-wheeled vehicles, such as bicycles or motorcycles, for daily transportation.

Furthermore, two-wheeled vehicles such as bicycles or motorcycles require users to maintain good balance between the two wheels. However, while a two-wheeled vehicle is operating, its center of gravity switches left and right randomly between the two wheels, which causes decreased stability and safety issues for riders.

In addition, most current children's bicycles or handicap motorcycles further have assisting wheels. However, the assisting wheels are directly pivoted to two sides of the main body of the children's bicycles or to handicapped motorcycles, when the vehicle is turning at a relatively higher speed, one of the assisting wheels is lifted off the ground, which makes the vehicle easy to tilt over.

Therefore, it is desirable to provide a safeguard wheel assembly for a two-wheeled vehicle to mitigate and/or obviate the aforementioned problems.

SUMMARY OF THE INVENTION

An objective of the present invention is to provide a safeguard wheel assembly for a two-wheeled vehicle, which can provide better safety and stability for the vehicle.

In order to achieve the above-mentioned objectives an improved wheel safeguard assembly for a two-wheeled vehicle that is installed on a bottom of a main body, comprises:

two guide columns respectively attached on two sides of a rear end of the main body;

a base disposed across the rear end of the main body and behind a rear wheel of the two-wheeled vehicle;

two rollers respectively pivoted on two sides of the base such that a front wheel and the rear wheel of the two-wheeled vehicle and the two rollers are all aligned in one plane;

two sets of rotatable linkages, one end of each linkage respectively pivoted to the two sides of the rear end of the main body, and another end of each linkage respectively pivoted to the two sides of the base adjacent to the rollers;

two guide slots respectively formed in the two sides of the base, with each guide column disposed in each guide slot. Therefore, the front wheel and the rear wheel are guided to enable swinging and to drive the rotatable linkages to pull the front wheel and the rear wheel back to a center position. Accordingly, the stability, safety and convenience of the two-wheeled vehicle are improved, and the wheel safeguard assembly is more practical.

The linkage comprises an upper rod and a lower rod pivoted to each other, an end of each upper rod pivoted to the two sides of the rear end of the main body, an end of each lower rod pivoted to the two sides of the base adjacent to the roller, and a torque spring is disposed between the upper rod and the lower rod.

A predetermined included angle is formed between the upper rod and the lower rod, and each torque spring is disposed at the respective pivot between the upper rod and the lower rod, the two ends of each torque spring respectively extending to attach to the upper rod and the lower rod.

Two upper extension arms and two lower extension arms are respectively disposed and paired on two sides of the rear end of the main body, the upper extension arm being disposed above the lower extension arm, one end of each upper rod being pivoted to one end of the upper extension arm, and the guide columns are respectively connected to one end of each lower extension arm.

The two upper extension arms and two lower extension arms are all connected to a support panel; the upper rods are respectively connected to two sides of the support panel, and the guide columns are also respectively disposed in the two sides of the support panel below the upper rods.

The bottom of the base has a support frame; the rollers are respectively pivoted to two sides of the support frame, and the lower rods are respectively pivoted to two ends of the support frame.

In another embodiment of the present invention, a wheel safeguard assembly for a two-wheeled vehicle installed on a bottom of a main body comprises:

two guide columns respectively attached to two sides of a rear end of the main body;

a base disposed across the rear end of the main body and behind a rear wheel of the two-wheeled vehicle;

two rollers respectively pivoted to two sides of the base such that a front wheel and the rear wheel of the two-wheeled vehicle and the two rollers are all aligned in one plane;

two air cylinders, one end of each air cylinder respectively pivoted to the two sides of the rear end of the main body, and another end of each air cylinder being respectively pivoted to the two sides of the base adjacent to the rollers;

two guide slots respectively formed in the two sides of the base and each guide column disposed in each guide slot, such that the front wheel and the rear wheel are guided to enable swinging and to drive the air cylinders to pull the front wheel and the rear wheel back to a center position.

Accordingly, the stability, safety and convenience of the two-wheeled vehicle are improved, and the wheel safeguard assembly is more practical.

Each air cylinder comprises a cylinder body, the cylinder body jacketed with an outer tube and a spring, such that the outer tube is slideable along the cylinder body, and the two sides of the rear end of the main body above the guide columns are respectively pivoted to each cylinder body; and wherein a rod is slideably installed in each cylinder body, and the two sides of the base adjacent to the rollers are respectively pivoted to each rod.

A threaded portion of an outer surface at the bottom end of the cylinder body is engaged with an O-ring, and the spring is compressed between the bottom of the outer tube 91 and the top of the O-ring, Therefore, by rotating the O-ring, the position of the O-ring on the cylinder body can be changed to adjust the tension on the outer tube.

Two upper extension arms and two lower extension arms are respectively disposed and paired on two sides of the rear end of the main body, the upper extension arm is disposed above the lower extension arm, one end of each upper rod being pivoted to one end of the upper extension arm, and the guide columns are respectively connected to one end of each lower extension arm.

The two upper extension arms and two lower extension arms are all connected to a support panel; the upper rods are respectively connected to two sides of the support panel, and the guide columns are also respectively disposed in the two sides of the support panel below the upper rods.

The bottom of the base has a support frame, and the rollers are respectively pivoted to two sides of the support frame, with the lower rods being respectively pivoted to two ends of the support frame.

The bottom of the base has a support frame, and two support elements are respectively pivoted to two ends of the support frame; a rotatable ball is pivoted to a bottom of each supporting element.

In another embodiment of the present invention, a wheel safeguard assembly for a two-wheeled vehicle installed on a bottom of a main body comprises:

two guide columns respectively attached to two sides of a rear end of the main body;

one base disposed across the rear end of the main body and between a front wheel and a rear wheel of the two-wheeled vehicle;

two rollers respectively pivoted to two sides of the base such that a front wheel and the rear wheel of the two-wheeled vehicle and the two rollers are all aligned in one plane;

two sets of rotatable linkages, one end of each linkage respectively pivoted to the two sides of the rear end of the main body, and another end of each linkage respectively pivoted to the two sides of the base;

two guide slots respectively formed in the two sides of the base and each guide column disposed in a respective guide slot, such that the front wheel and the rear wheel are guided to enable swinging and to drive the rotatable linkages to pull the front wheel and the rear wheel back to a center position.

Accordingly, the stability, safety and convenience of the two-wheeled vehicle are improved, and the wheel safeguard assembly is more practical.

The linkage comprises an upper rod and a lower rod pivoted to each other, an end of each upper rod being respectively pivoted to the two sides of a bottom of the main body, an end of each lower rod being respectively pivoted to the two sides of the base adjacent to the roller, and a torque spring disposed between each upper rod and each lower rod.

The two upper extension arms and two lower extension arms are all connected to a support panel, and the cylinder bodies are respectively connected to two sides of the support panel; the guide columns also are respectively disposed on the two sides of the support panel below the cylinder bodies.

The bottom of the base has a support frame, and two support elements are respectively pivoted to two ends of the support frame; a rotatable ball is pivoted to a bottom of each supporting element.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
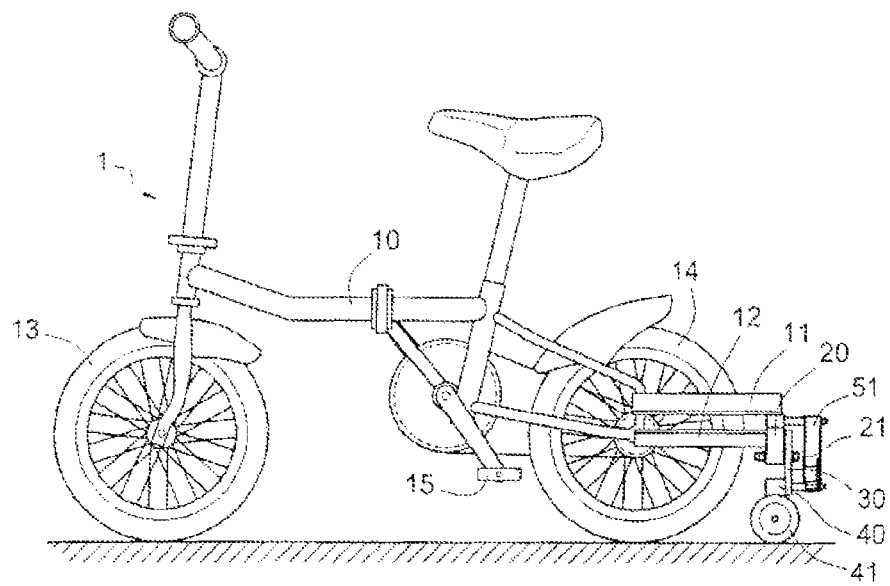
FIG. 1 is a side view of a first embodiment of the present invention.

Please refer to FIG. 1. FIG. 1 is a schematic drawing of a first embodiment of the present invention. Also, please refer to FIG. 2 to FIG. 4. A wheel safeguard assembly of the present invention for a two-wheeled vehicle 1 is installed on a bottom of a main body 10. The wheel safeguard assembly comprises two guide columns, a base 30 having a fan shape, two rollers 41, two set of rotatable linkages 5 and two guide slots 31. In this embodiment, the two-wheeled vehicle 1 is a bicycle. Two upper extension arms 11 and two lower extension arms 12 are respectively disposed and paired on two sides of the rear end of the main body 10, and the upper extension arms 11 are disposed above the lower extension arms 12. The two upper extension arms 11 and the two lower extension arms 12 all extend to behind a rear wheel 14 of the bicycle 1 and are connected to a support panel 20. The guide columns 21 are also respectively disposed on the two sides of the support panel 20 adjacent to one end of lower extension arms 12. The base 30 is disposed across the rear end of the main body 10 behind the rear wheel 14 of the two-wheeled vehicle 1.

The bottom of the base 30 has a support frame 40 extending along the two sides of the main body 10 (as shown in FIG. 1 to FIG. 4), and the rollers 41 are respectively pivoted to the support frame 40 and disposed on two sides of the base 30, such that a front wheel 13 and the rear wheel 14 of the two-wheeled vehicle and the two rollers 41 are all aligned in one plane. The linkage 5 comprises an upper rod 51 and a lower rod 52 pivoted with each other, and a predetermined included angle is formed between the upper rod 51 and the lower rod 52. The predetermined included angle is 90° in this embodiment. An end of each upper rod 51 is pivoted to the two sides of the support panel 20 above guide columns 21 and adjacent to one end of the upper extension arms 11, and an end of each lower rod 51 is pivoted to the two sides of the support frame 40 adjacent to the roller 41.

Figure 3:
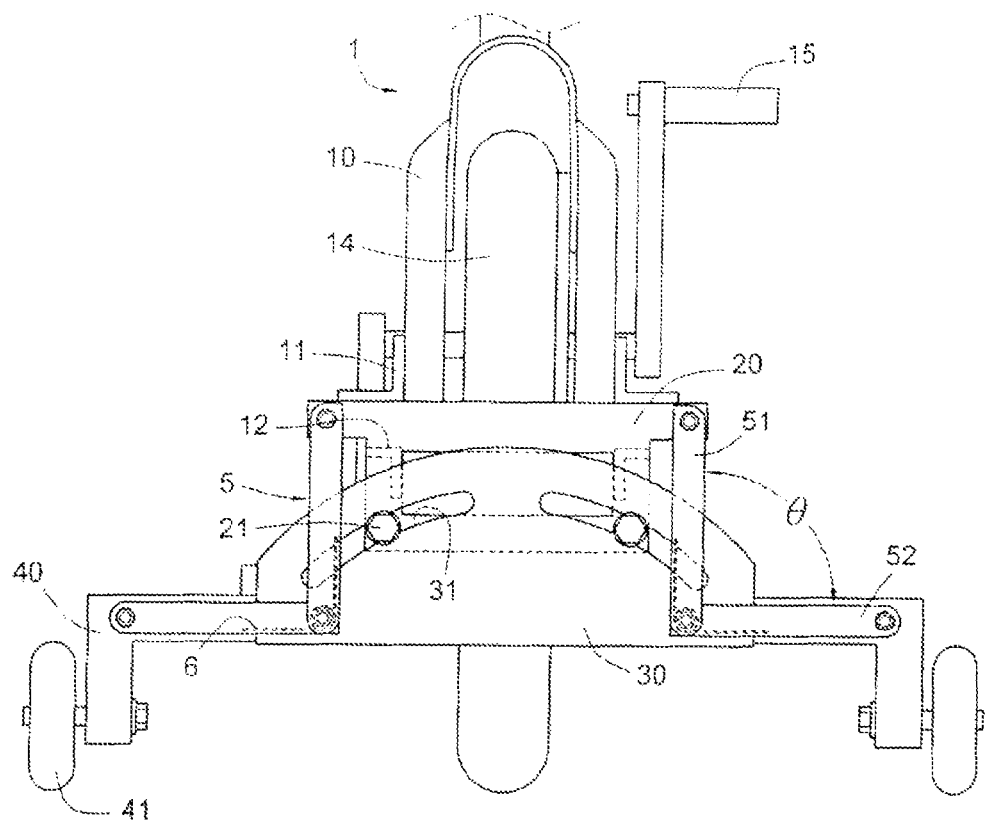
FIG. 3 is a local detailed drawing of FIG. 2.
Figure 4:
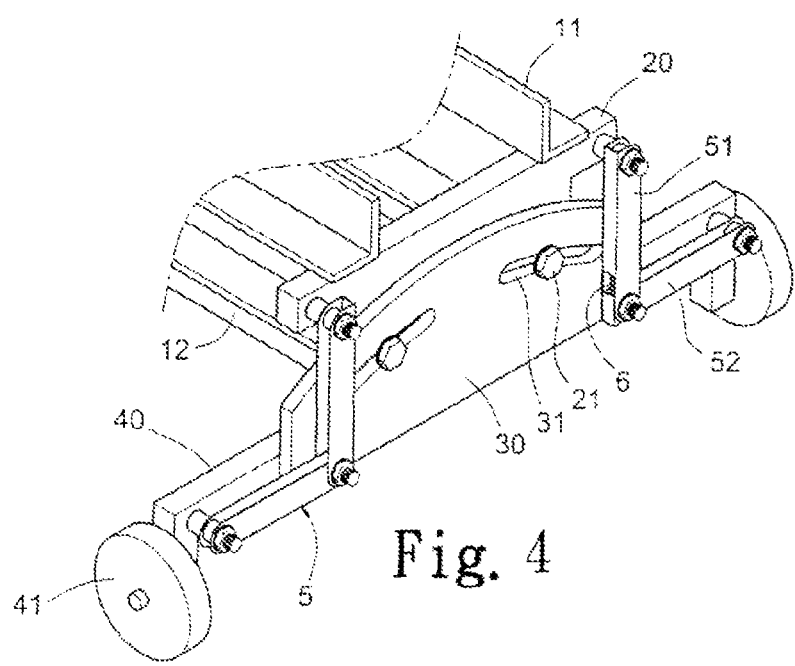
FIG. 4 is a perspective view of the safeguard wheels shown in FIG. 2.
Figure 5:
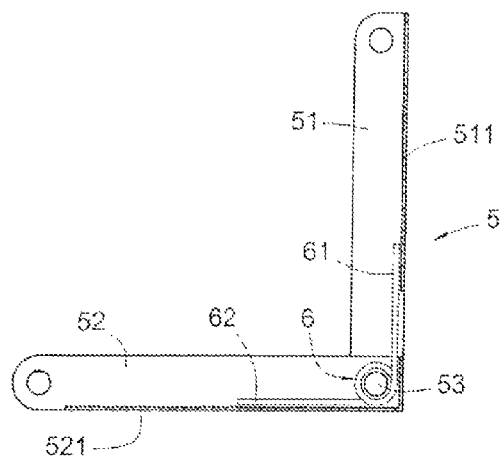
FIG. 5 is a cross-sectional drawing of a linkage of the present invention.
Figure 6:
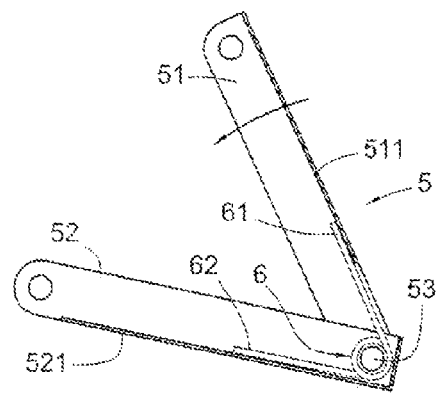
FIG. 6 is a usage schematic drawing of FIG. 5.
Figure 7:
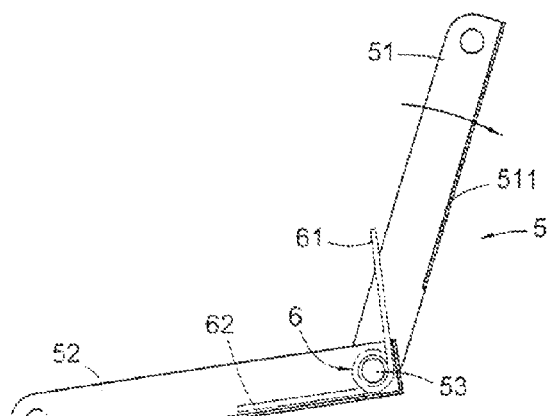
FIG. 7 is another usage schematic drawing of FIG. 5.

A torque spring 6 is disposed between the upper rod 51 and the lower rod 52 (as shown in FIG. 3 and FIG. 4) and pivoted to a pivot shaft 53 of the upper rod 51 and the lower rod 52 (as shown in FIG. 5) and two ends 61, 62 of the torque spring 6 extend between the upper rod 51 and the lower rod 52. Therefore, when the upper rod 51 and the lower rod 52 swing to cause the linkage 5 to be folded more (as shown in FIG. 6), one side 511, 521 of the upper rod 51 and the lower rod 52 compresses the ends 61, 62 of the torque spring 6 at the same time, such that the upper rod 51 and the lower rod 52 bear the tension from the torque spring 6 to fold the linkage 5 more. When the upper rod 51 and the lower rod 52 swing left and right to unfold the linkage 5 (as shown in FIG. 7), and the upper rod 51 and the lower rod 52 release the ends 61, 62 of the torque spring 6 to unfold the linkage 5.

Figure 8:
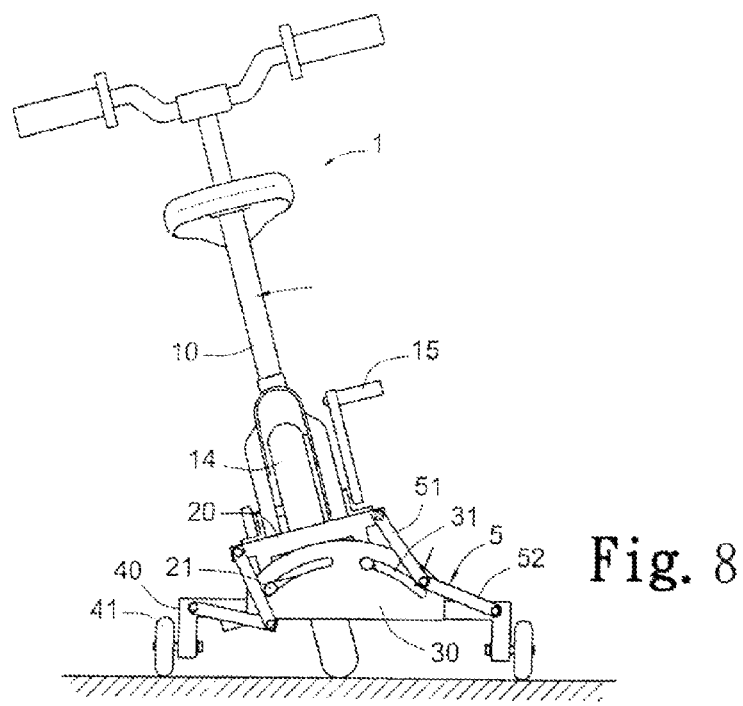
FIG. 8 is a usage schematic drawing of FIG. 2.
Figure 9:
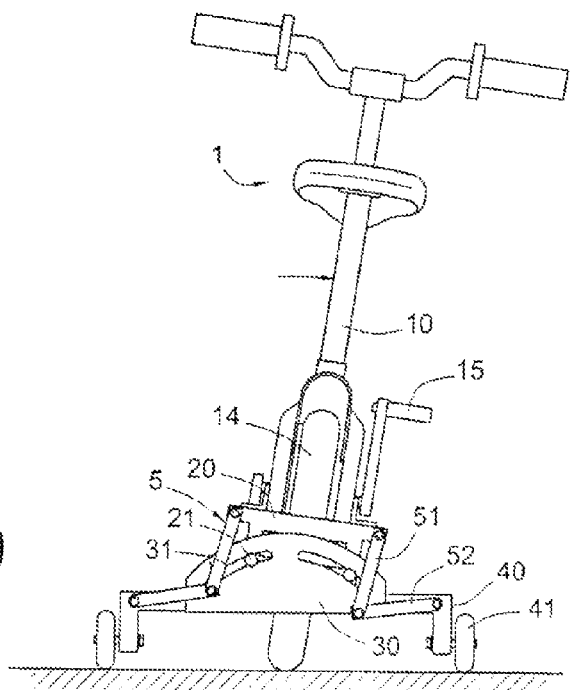
FIG. 9 is another usage schematic drawing of FIG. 2.

Two guide slots 31 are respectively formed in the two sides of the base 30 and each guide column 21 is disposed in each guide slot 31, such that when a user is riding the two-wheel vehicle 1, (as shown in FIG. 8 and FIG. 9) the front wheel 13 and the rear wheel 14 are guided to enable swinging left and right on the ground and drive the linkages 5 to pull the front wheel 13 and the rear wheel 14 back to a center position.

Figure 2:
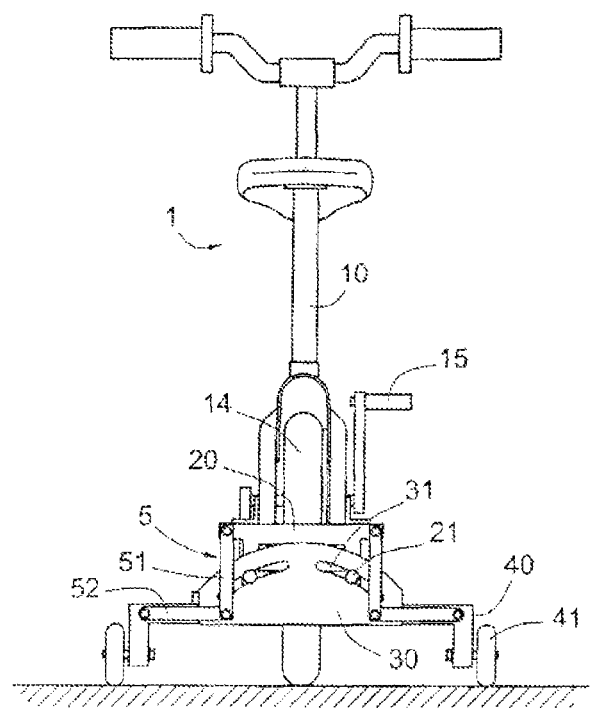
FIG. 2 is a schematic drawing of the first embodiment of the present invention.

With the above-mentioned structure, the front wheel 13 and the rear wheel 14 of the two-wheeled vehicle and the two rollers 41 are all aligned in one plane (as shown in FIG. 1 to FIG. 3), such that the two-wheeled vehicle 1 is maintained statically balanced. Therefore, the rider does not need to support himself or herself with one leg, and when the rider steps on the pedals 15 of the two-wheeled vehicle 1 to move forward, the front wheel 13, the rear wheel 14 and the two rollers 41 help the two-wheeled vehicle 1 to maintain balance free from swinging. When the two-wheeled vehicle 1 is turning such that the front and rear wheels 13, 14 are swinging left or right (as shown in FIG. 8 and FIG. 9), each guiding column 21 moves along the guiding slot 31 to keep the roller 41 at the two sides of the base 30 touching the ground. Therefore, the front wheel 13, the rear wheel 14 and the two rollers 41 help the two-wheeled vehicle 1 to maintain balance while avoiding the roller 41 from lifting off the ground while the two-wheeled vehicle 1 is turning quickly, thereby improving the stability and safety of the two-wheeled vehicle 1. When the two-wheeled vehicle 1 goes back to a straight line movement, the bias force of the torque spring 6 drives the upper rod 51 and the lower rod 52 to rotate back to move the front wheel 13 and the rear wheel 14 back to a perpendicular position with respect to the ground, thus forcing the two-wheeled vehicle 1 back to an upright position.

Accordingly, the front wheel 13 and the rear wheel 14 of the two-wheeled vehicle and the two rollers 41 are all aligned in one plane (as shown in FIG. 1 to FIG. 3), such that the two-wheeled vehicle 1 is maintained statically balanced. Therefore, the rider does not need to support himself or herself with one leg, and the two-wheeled vehicle 1 has the two assembly ends extending from the main body 10. The first assembly end is provided by the lower extension arms 12, and the lower extension arms 12 respectively utilize the guiding column to be slidingly attached to the arced guiding slots 31 of the base 30 with the guiding columns 21. Therefore, the first assembly end is able to generate arc-shaped movement relative to the ground, such that the two-wheeled vehicle 1 is able to prevent the rollers 41 from lifting off the ground while the front and rear wheels 13, 14 are turning, thus ensuring the two-wheeled vehicle 1 safely and quickly finishes the turning movement.

The second assembly end is provided by the upper extension arms 11. The upper extension arms 11 utilize the flexible and extendable linkage 5 for attachment to the base 30 to force the two-wheeled vehicle 1 to return back to the perpendicular position after turning. Consequently, the stability, safety and convenience of the two-wheeled vehicle 1 are improved, and the wheel safeguard assembly is more practical. Moreover, the width of the roller 41 of the wheel safeguard assembly may be equal to the width of the handlebars of the two-wheeled vehicle 1, such that the wheel safeguard assembly does not require more space, and the wheel safeguard assembly at the rear end of the vehicle can provide a bumper effect.

Figure 10:
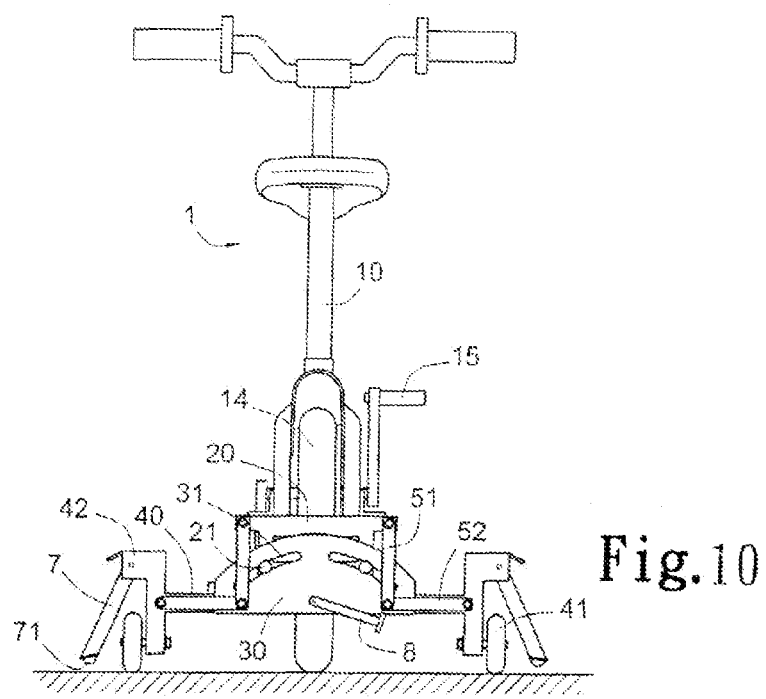
FIG. 10 is a schematic drawing of another embodiment of FIG. 2.
Figure 12:
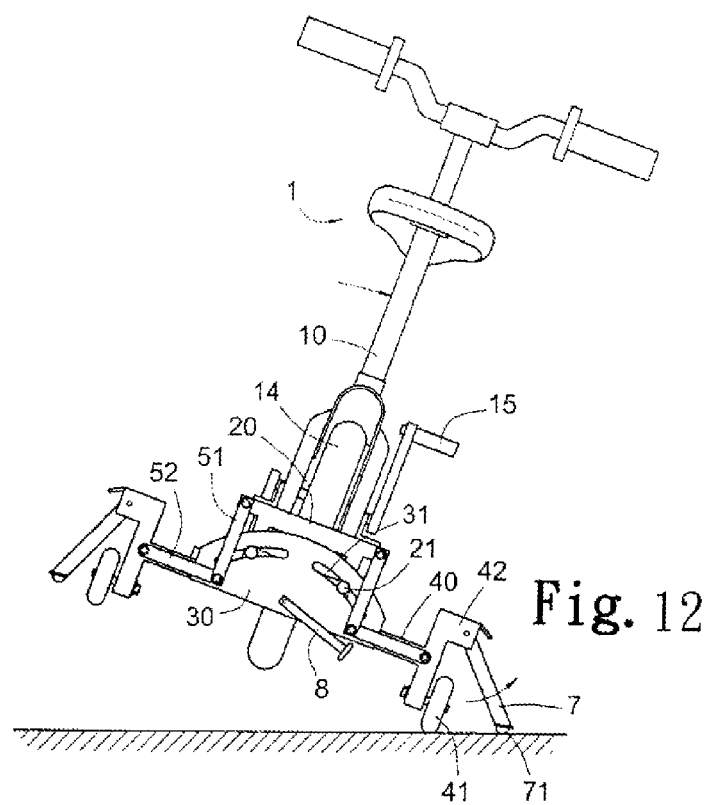
FIG. 12 is another usage schematic drawing of FIG. 10.

The present invention may further provide another embodiment: a pivot region 42 (as shown in FIG. 10), with each pivot region 42 having a support rod 7 that is able to be rotated away from the main body 10 and a rotatable ball 71 pivoted to a bottom of each supporting rod 7. Therefore, when the two-wheeled vehicle 1 is tilted to an extent that causes the support rod 7 to touch the ground 9 (as shown in FIG. 12), the rotatable ball 71 rolls along the ground to help the support to rotate a predetermined distance away from the main body 10, to support the main body and prevent the main body 10 from tilting over for better riding safety.

Figure 11:
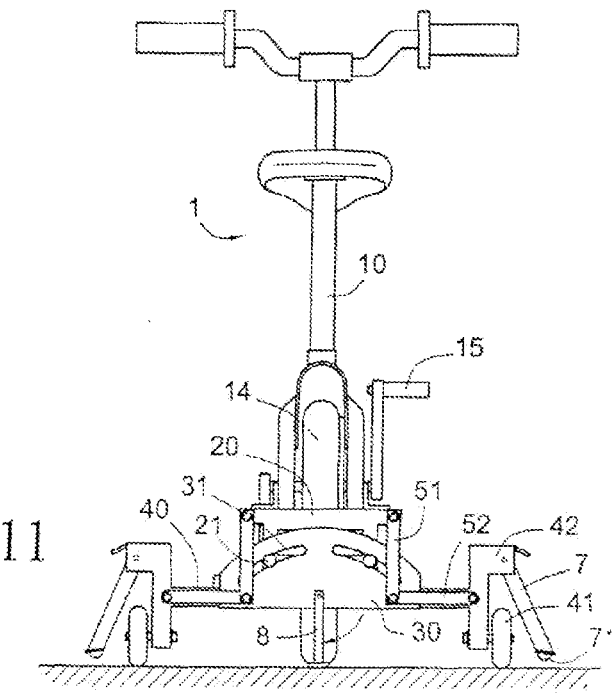
FIG. 11 is a usage schematic drawing of FIG. 10.

Moreover, a stand 8 is pivoted to the bottom of the base 30 (as shown in FIG. 10), when the rider wants to park the two-wheeled vehicle 1, he or she can adjust the stand 8 to be perpendicular (as shown in FIG. 11), to park and support the two-wheeled vehicle 1.

Figure 13:
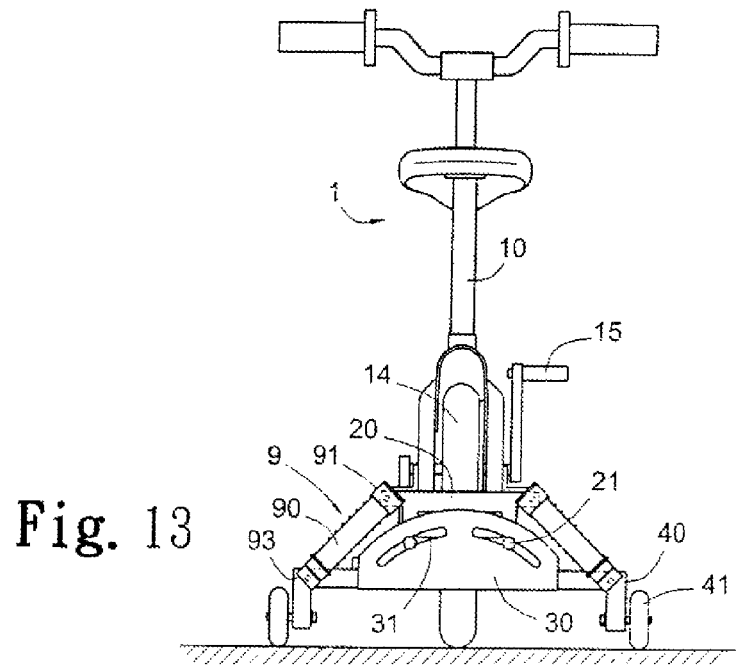
FIG. 13 is a schematic drawing of a second embodiment of the present invention.
Figure 14:
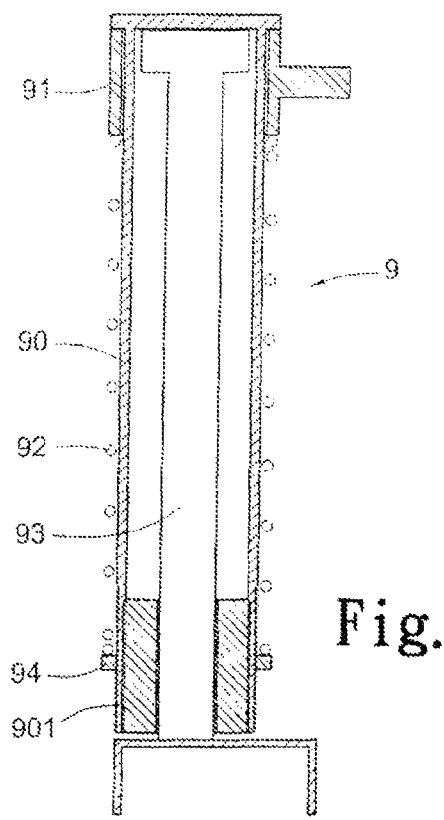
FIG. 14 is a cross-sectional drawing of an air cylinder shown in FIG. 13.
Figure 15:
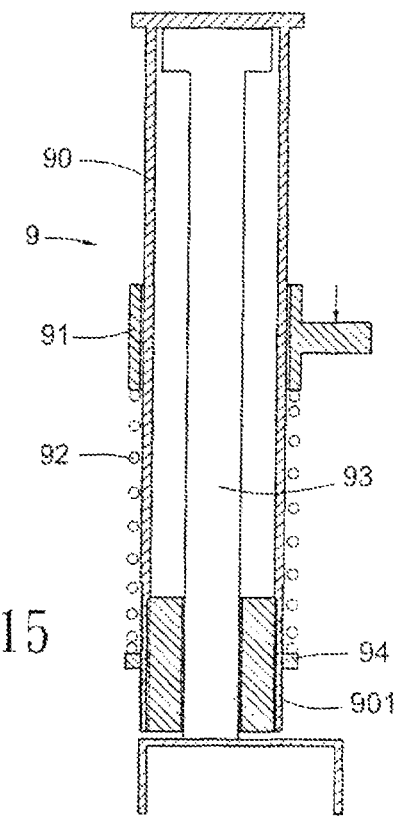
FIG. 15 is a usage schematic drawing of FIG. 14.
Figure 16:
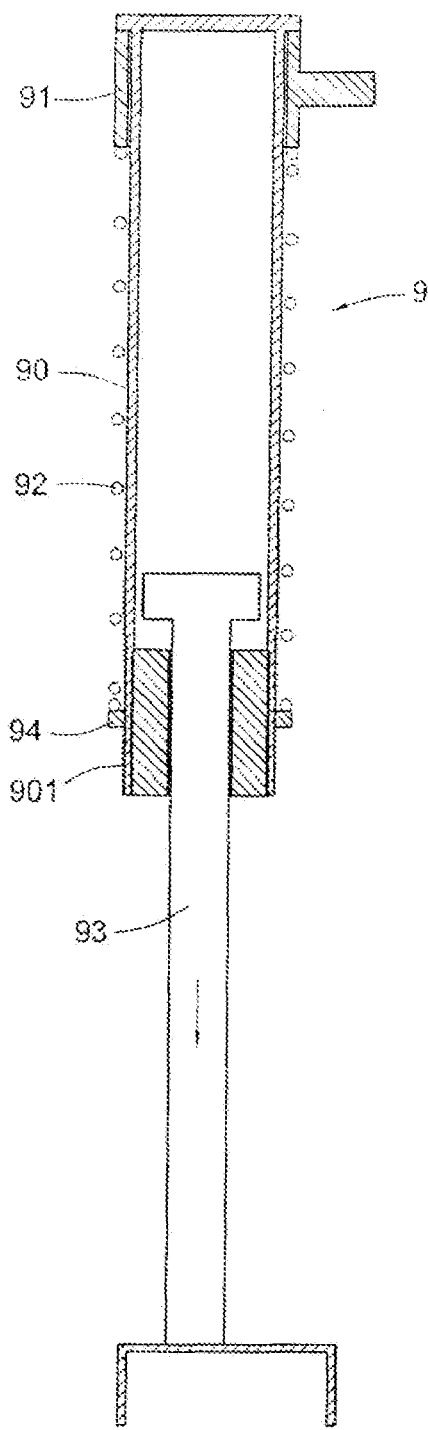
FIG. 16 is another usage schematic drawing of FIG. 14.
Figure 17:
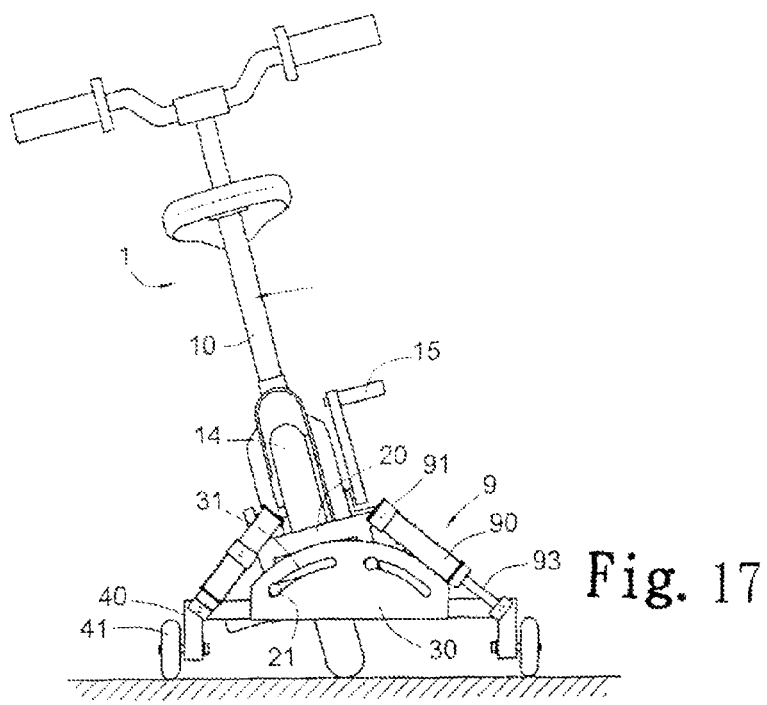
FIG. 17 is a usage schematic drawing of FIG. 13.
Figure 18:
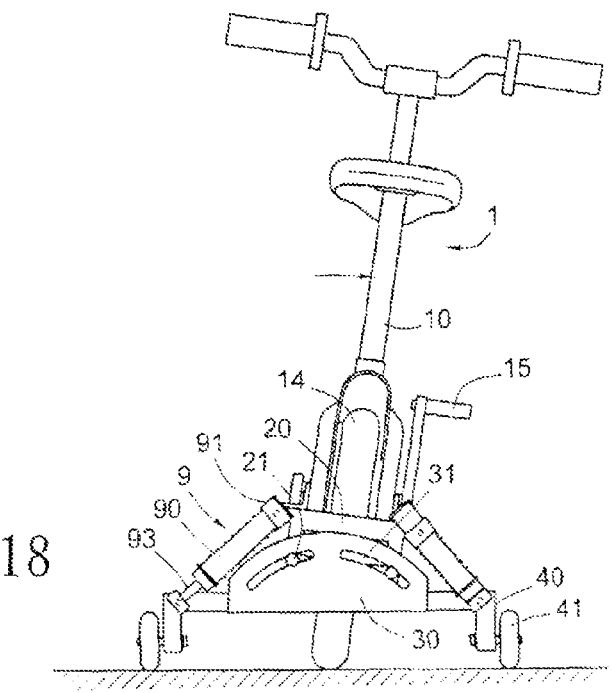
FIG. 18 is another usage schematic drawing of FIG. 13.

Please refer to FIG. 13. FIG. 13 is a schematic drawing of a second embodiment of the present invention. The linkages 5 shown in FIG. 2 to FIG. 4 can be replaced by two extendable air cylinders 9. Each air cylinder 9 comprises a cylinder body 90 (as shown in FIG. 14), and the cylinder body 90 is jacketed with an outer tube 91 and a spring 92. A threaded portion 901 of an outer surface at the bottom end of the cylinder body 90 is engaged with an O-ring 94, and the spring 92 is compressed between the bottom of the outer tube 91 and the top of the O-ring 94, such that the outer tube 91 is slideable along the cylinder body 90 via the spring 92 (as shown in FIG. 15). Therefore, by rotating the O-ring 94, the position of the O-ring 94 on the cylinder body 90 can be changed to adjust the tension on the outer tube 91. Furthermore, a rod 93 is slideably installed in each cylinder body 90. Therefore, the outer tube 91 slides along the cylinder body 90 to compress the spring 92, and the rod 93 is pulled out the cylinder body 90 (a shown in FIG. 16). Moreover, the outer tubes 91 are respectively pivoted to the two sides of the support panel 20 above the guide columns 21, and the rods 93 are respectively pivoted to the two sides of the support frame 40 adjacent to the rollers 41. Accordingly, when the rider turns the two-wheeled vehicle 1 to swing left and right (as shown in FIG. 17 and FIG. 18), the air cylinders 9 also swing left and right to generate stretching movements. When the rider is not turning the two-wheeled vehicle 1, the tension from the spring 92 drives the outer tubes 91 to reposition to pull the front and rear wheels 13, 14 back to the perpendicular position; the other element structures may be identical to the first embodiment. Therefore, the stability, safety and convenience of the two-wheeled vehicle 1 are improved, and the wheel safeguard assembly is more practical.

Figure 19:
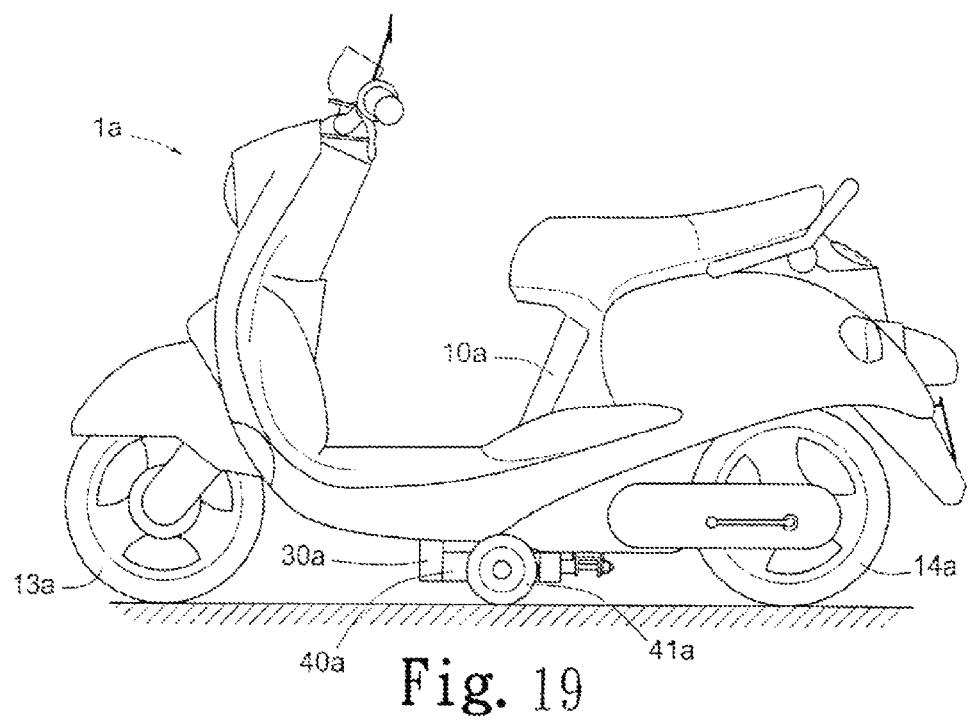
FIG. 19 is a schematic drawing of a third embodiment of the present invention.
Figure 20:
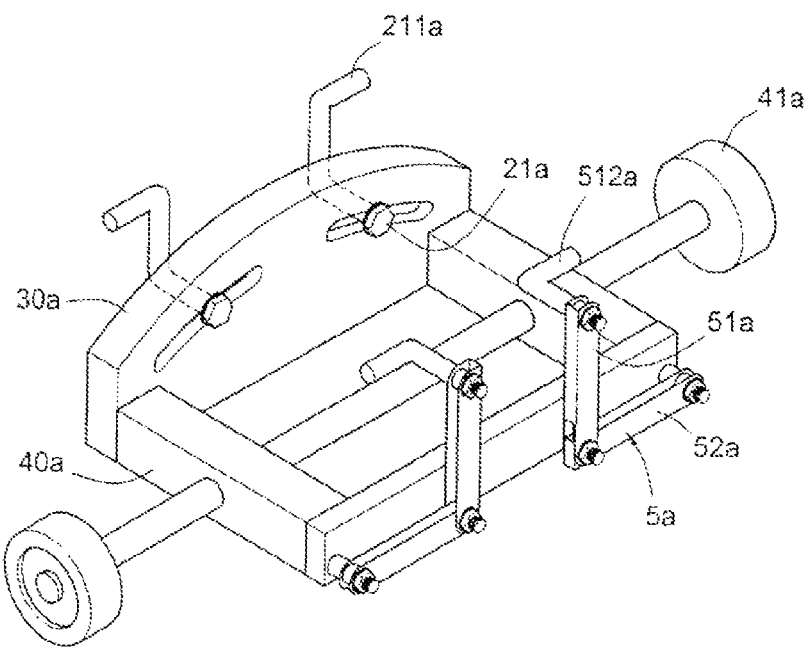
FIG. 20 is a perspective view of safeguard wheels shown in FIG. 19.
Figure 21:
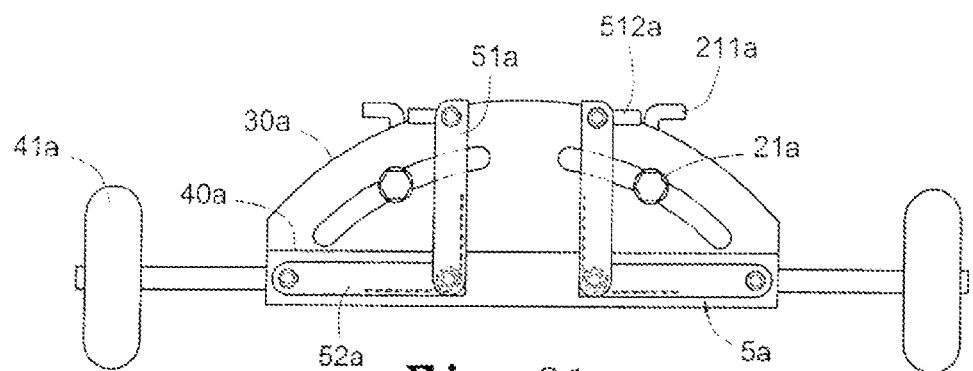
FIG. 21 is a schematic drawing of safeguard wheels shown in FIG. 19.

Please refer to FIG. 19. FIG. 19 is a schematic drawing of a third embodiment of the present invention. Please also refer to FIG. 20 and FIG. 21. As shown in FIG. 20 and FIG. 21, the two-wheeled vehicle is a motorcycle. Respective extended portions 211*a* of the guiding columns 21*a* are respectively attached at both sides of the bottom of the main body 10*a*; and the base 30*a* is disposed across the rear end of the main body 10*a* and between the front wheel 13*a* and the rear wheel 14*a* of the two-wheeled vehicle 1*a*. The support frame 40*a* is attached to the bottom of the base 30*a*, such that the base 30*a* and the support frame 40*a* form a rectangle frame, and the rollers 41*a* are respectively pivoted onto the both sides of the support frame 40*a*. The upper rods 51*a* of the linkages 5*a* are respectively pivoted to the both sides of the bottom of the main body 10*a* with a shaft rod 512*a*, and the lower rods 52*a* of the linkages 5*a* are respectively pivoted to both sides of the support frame 40*a*. Other element structures may be identical to the first embodiment. Accordingly, the stability, safety and convenience of the two-wheeled vehicle 1 are improved, and the wheel safeguard assembly is more practical.

Figure 22:
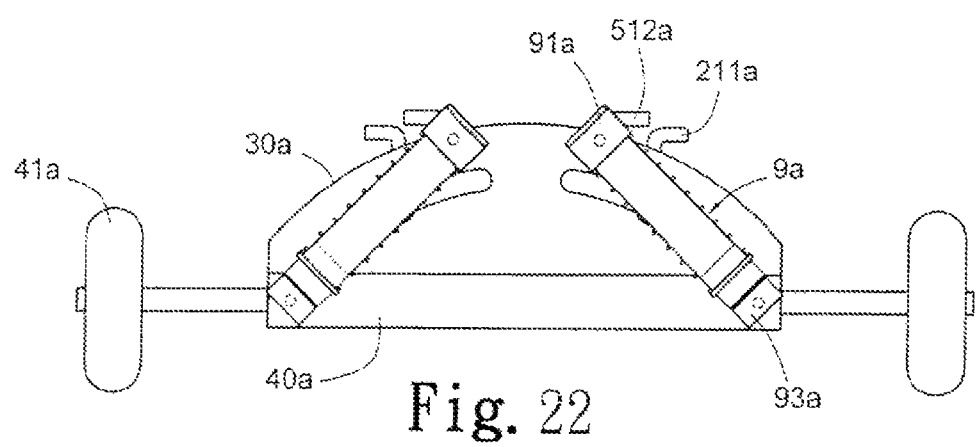
FIG. 22 is a schematic drawing of a fourth embodiment of the present invention.

Please refer to FIG. 22. FIG. 22 is a schematic drawing of a fourth embodiment of the present invention. As shown in FIG. 22, the two-wheeled vehicle is a motorcycle, and two extendable air cylinders 9*a* are used to replace the two linkages 5*a*. Each outer tube 91*a* of the air cylinders 9*a* are respectively pivoted to the both sides of the bottom of the main body 10*a* with the shaft rod 512*a*, and the rods 93*a* of the air cylinder 9*a* are respectively pivoted to both sides of the support frame 40*a*. Other element structures may be identical to the first embodiment. Accordingly, the stability, safety and convenience of the two-wheeled vehicle 1 are improved, and the wheel safeguard assembly is more practical.

Although the present invention has been explained in relation to its preferred embodiment, it is to be understood that many other possible modifications and variations can be made without departing from the spirit and scope of the invention as hereinafter claimed.

What is claimed is:

1. A wheel safeguard assembly for a two-wheeled vehicle installed on a bottom of a main body, comprising:
    two guide columns respectively attached on two sides of a rear end of the main body;
    a base disposed across the rear end of the main body and behind a rear wheel of the two-wheeled vehicle;
    two rollers respectively pivoted on two sides of the base such that a front wheel and the rear wheel of the two-wheeled vehicle and the two rollers are all aligned in one plane;
    two rotatable linkages, one end of each linkage respectively pivoted to the two sides of the rear end of the main body, and another end of each linkage respectively pivoted to the two sides of the base adjacent to the rollers;
    two guide slots respectively formed in the two sides of the base and each guide column disposed in each guide slot, such that the front wheel and the rear wheel are guided to enable swinging and the rotatable linkages pull the front wheel and the rear wheel back to a center position.

2. The wheel safeguard assembly for a two-wheeled vehicle as claimed in claim 1, wherein each linkage comprises an upper rod and a lower rod pivoted with each other, an end of each upper rod pivoted to the two sides of the rear end of the main body, an end of each lower rod pivoted to the two sides of the base adjacent to the roller, and a torque spring disposed between the upper rod and the lower rod.

3. The wheel safeguard assembly for a two-wheeled vehicle as claimed in claim 2, wherein two upper extension arms and two lower extension arms are respectively disposed and paired on two sides of the rear end of the main body, each upper extension arm disposed above the respective lower extension arm, one end of each upper rod being pivoted to one end of the upper extension arm, and the guide columns are respectively connected to one end of each lower extension arm.

4. The wheel safeguard assembly for a two-wheeled vehicle as claimed in claim 3, wherein the two upper extension arms and two lower extension arms are all connected to a support panel, the upper rods are respectively connected to two sides of the support panel, and the guide columns are also respectively disposed in the two sides of the support panel below the upper rods.

5. The wheel safeguard assembly for a two-wheeled vehicle as claimed in claim 1, wherein the bottom of the base has a support frame, two support elements are respectively pivoted to two ends of the support frame, and a rotatable ball is pivoted to a bottom of each supporting element.

6. The wheel safeguard assembly for a two-wheeled vehicle as claimed in claim 1, wherein a stand is pivoted to the bottom of the base.

7. A wheel safeguard assembly for a two-wheeled vehicle installed on a bottom of a main body, comprising:
    two guide columns respectively attached to two sides of a rear end of the main body;
    one base disposed across the rear end of the main body and behind a rear wheel of the two-wheeled vehicle;
    two rollers respectively pivoted to two sides of the base such that a front wheel and the rear wheel of the two-wheeled vehicle and the two rollers are all aligned in one plane;
    two air cylinders, one end of each air cylinder respectively pivoted to the two sides of the rear end of the main body, and another end of each air cylinder respectively pivoted to the two sides of the base adjacent to the rollers;
    two guide slots respectively formed in the two sides of the base and each guide column disposed in each guide slot, such that the front wheel and the rear wheel are guided to enable swinging and the air cylinders pull the front wheel and the rear wheel back to a center position.

8. The wheel safeguard assembly for a two-wheeled vehicle as claimed in claim 7, wherein each air cylinder comprises a cylinder body, the cylinder body jacketed with an outer tube and a spring, such that the outer tube is slideable along the cylinder body, and the two sides of the rear end of the main body above the guide columns are respectively pivoted to each outer tube; and wherein a rod is slideably installed in each cylinder body, and the two sides of the base adjacent to the rollers are respectively pivoted to each rod.

9. The wheel safeguard assembly for a two-wheeled vehicle as claimed in claim 8, wherein two upper extension arms and two lower extension arms are respectively disposed and paired on two sides of the rear end of the main body, each upper extension arm being disposed above the respective lower extension arm, one end of each cylinder body being pivoted to one end of each upper extension arm, and the guide columns are respectively connected to one end of each lower extension arm.

10. The wheel safeguard assembly for a two-wheeled vehicle as claimed in claim 9, wherein the two upper extension arms and two lower extension arms are all connected to a support panel, and the cylinder bodies are respectively connected to two sides of the support panel, the guide columns also respectively disposed in the two sides of the support panel below the cylinder bodies.

11. A wheel safeguard assembly for a two-wheeled vehicle installed on a bottom of a main body, comprising:
    two guide columns respectively attached to two sides of a rear end of the main body;
    one base disposed across the rear end of the main body and between a front wheel and a rear wheel of the two-wheeled vehicle;
    two rollers respectively pivoted to two sides of the base such that a front wheel and the rear wheel of the two-wheeled vehicle and the two rollers are all aligned in one plane;
    two rotatable linkages, one end of each linkage respectively pivoted to the two sides of the rear end of the main body, and another end of each linkage respectively pivoted to the two sides of the base;

two guide slots respectively formed in the two sides of the base and each guide column disposed in a respective guide slot, such that the front wheel and the rear wheel are guided to enable swinging and the rotatable linkages pull the front wheel and the rear wheel back to a center position.

12. The wheel safeguard assembly for a two-wheeled vehicle as claimed in claim 11, wherein the linkage comprises an upper rod and a lower rod pivoted with each other, an end of each upper rod being respectively pivoted to the two sides of a bottom of the main body, an end of each lower rod being respectively pivoted to the two sides of the base adjacent to the roller, and a torque spring disposed between each upper rod and each lower rod.

13. The wheel safeguard assembly for a two-wheeled vehicle as claimed in claim 12, wherein a predetermined included angle is formed between the upper rod and the lower rod, each torque spring being disposed at the respective pivot between the upper rod and the lower rod, and two ends of each torque spring respectively extend to attach to the upper rod and the lower rod.

14. The wheel safeguard assembly for a two-wheeled vehicle as claimed in claim 12, wherein the bottom of the base has a support frame, the rollers are respectively pivoted to two sides of the support frame, and the lower rods are respectively pivoted to two ends of the support frame.

* * * * *